Aug. 3, 1954 J. H. BOOTH 2,685,467
DRAG LINK END ASSEMBLY AND METHOD OF MAKING SAME
Filed Aug. 27, 1949
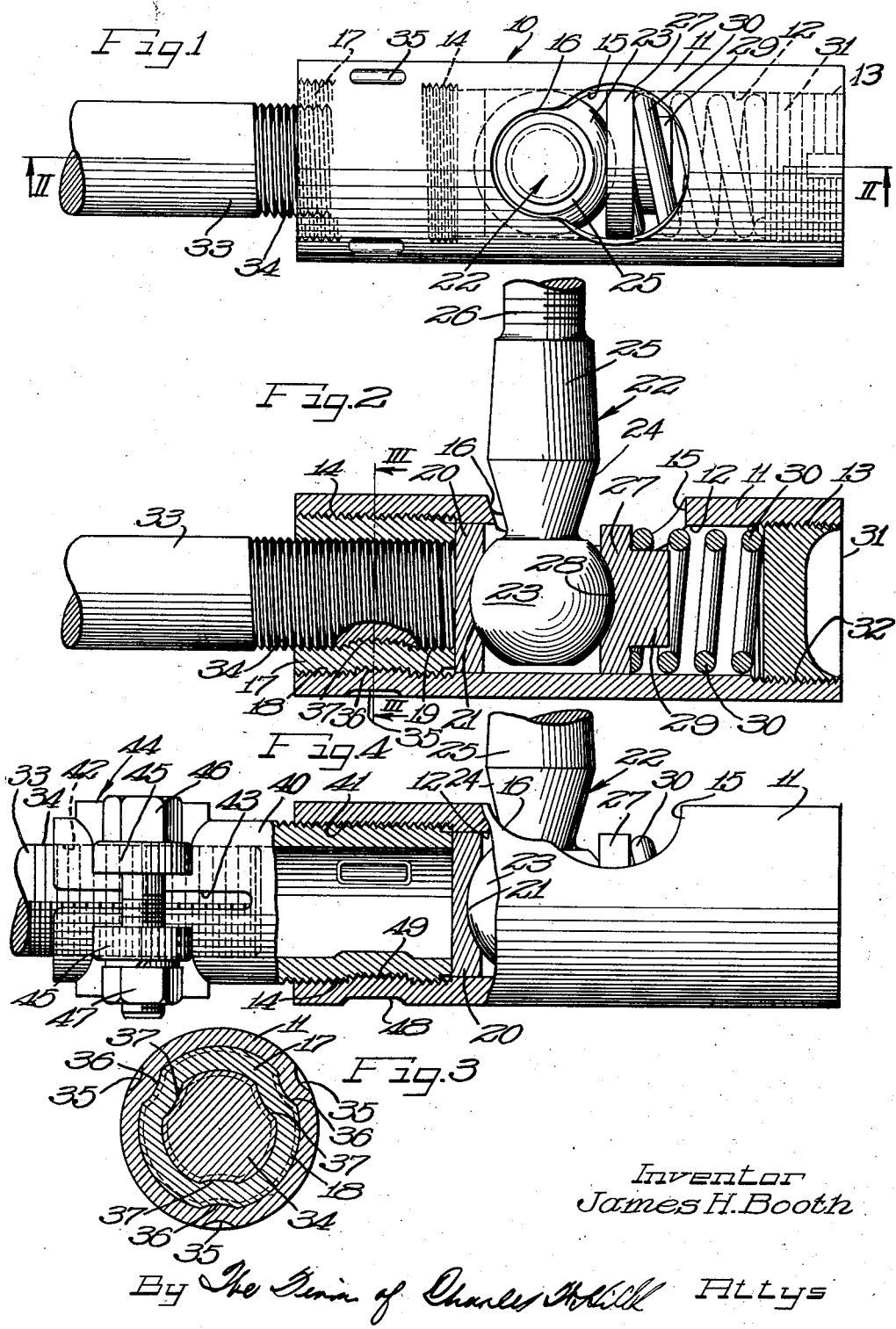
Inventor
James H. Booth
By The Firm of Charles H. Hill Attys Patented Aug. 3, 1954

2,685,467

UNITED STATES PATENT OFFICE 2,685,467

DRAG LINK END ASSEMBLY AND METHOD OF MAKING SAME

James H. Booth, Venice Township, Shiawassee County, Mich., assignor to Thompson Products, Inc., Cleveland, Ohio, a corporation of Ohio Application August 27, 1949, Serial No. 112,743

3 Claims. (Cl. 287—90)

1

While the present invention will be hereinafter specifically described as embodied in a drag link and for an automotive steering linkage, it should be understood that the principles of this invention are generally useful in any type of linkage having a tubular member of one diameter secured to the end of a rod of another diameter.

According to the present invention, an internally and externally threaded sleeve or bushing of a desired thickness connects the externally threaded end of a drag link with the internally threaded end of a tubular ball joint housing being threadedly retained within the tube and on the rod. The telescoped tube, sleeve and rod are held against relative rotation by local depressions formed by staking operations. The tube houses a ball joint with the ball end of the joint stud carried on seating disks. One of the disks is bottomed on the sleeve while the opposite disk is urged against the ball by a spring which is loaded by a plug threaded into the free end of the tube. If desired, the sleeve can project beyond the tube and have a split or slotted end to be adjustably locked on the rod by a surrounding clamp.

A feature of the invention therefore resides in the use of an internally and externally threaded sleeve of proper thickness to join a tubular joint housing of any diameter with a rod of any smaller diameter.

It is, thus, an important object of the present invention to provide an improved tube and rod assembly secured together by a threaded insert sleeve and by deformation of portions thereof.

Another important object of the present invention is to provide an improved method of making a control member end assembly for an automotive steering linkage by connecting a control rod and a larger diameter tubular end member through a threaded insert member and deforming portions of the insert member and the end member to secure the insert member therein in firmly interlocking engagement therewith.

A further important object of the present invention is to provide an improved control member end assembly including a tubular housing axially receiving a bushing telescopically positioned within the bore thereof and a control member having its free end extending axially into the bushing with the control member, the bushing and the tubular housing being secured together in interlocked relation by the deformation of corresponding portions in each of the assembled parts and the bushing serving to join the control member and the housing despite the relative sizes thereof.

2

Still another important object of the present invention is to provide an end assembly for a control member including a tubular housing member telescopically receiving a bushing in the bore thereof, the bushing extending beyond the bore of the housing member for receiving the free end of a control member and a ball joint having its ball head bottomed against the bushing within the housing and its stud protruding beyond the housing member, the bushing being secured within the tubular housing by deformation of corresponding portions of the housing of the bushing, and the bushing joining the control member and the housing.

Other and further important objects and features of this invention will be apparent from the disclosures in the specification and the accompanying drawings.

On the drawings:

Figure 1 is a plan elevational view of the control arm end assembly of the present invention;

Figure 2 is a sectional view, with parts shown in elevation, taken along the plane II—II of Figure 1;

Figure 3 is a sectional view taken along the plane III—III of Figure 2; and

Figure 4 is a side elevational view similar to Figure 2, with parts in elevation, of a modified form of control arm end assembly of the present invention.

As shown on the drawings:

In Figure 1, reference numeral 10 refers generally to a control member end assembly of the present invention.

The assembly 10 includes a generally cylindrical tubular housing member 11 having an axial bore 12 provided with internally threaded end portions 13 and 14. The tube 11 is provided with a generally semi-circular peripheral aperture 15 communicating with the bore 12 and a second, smaller, semi-circular aperture 16 joining the first aperture 15 and also communicating with the bore 12.

A cylindrical bushing 17 is axially telescoped within one end of the bore 12, the bushing having exterior threads 18 mating with the threads 14 of the bore 12 and inner threads 19 for a purpose to be hereinafter more fully described.

A seating plate 20 is positioned within the bore 12 to extend radially thereacross, the plate 20 having a spherical segmental seating surface 21 formed centrally thereof in one circular end face and having its other end face abutting the bushing 17. A ball stud, indicated generally at 22, is positioned within the tubular member 11, the stud 22 having a segmental spherical ball head 23 seating in the seating face 21 of the plate 20, a lower tapered neck or shank portion 24 projecting through the peripheral apertures 15 and 16 of the member 11, an upper tapered shank portion 25 projecting beyond the member 11 and a threaded cylindrical top portion 26. The threaded portion 26 and the shank portion 25 of the stud 22 are adapted to receive the apertured free end of a control member, such as a tie rod linkage or the like, of an independent automotive wheel suspension.

The spherical ball head 23 is urged into engagement with the seating surface 21 of the plate 20 by second seating plate 27 having a segmental spherical seating surface 28 similar to the surface 21 of the plate 20 and a cylindrical embossment 29 formed in the surface of the plate 27 opposite the seating face 28. A coiled tension spring 30 is confined between the plate 27 and plug 31 having exterior threads 32 threadedly engaging the threads 13 of the bore 12. It will be seen that the spring 30 urges the second seating plate 27 and the ball head 23 into seated engagement with the face 21 of the plate 20 which in turn is bottomed against the interior end surface of the bushing 17. The control member or arm 33 may be a drag link, a tie rod, or other control member, such as is conventionally a component of a steering linkage of an automotive vehicle, and may be of considerably smaller exterior diameter than the interior diameter of the housing, since the bushing may be made with varying wall thicknesses to accommodate varying sizes of both housings and rods.

Although the arm 33 is threadedly secured within the bushing 17 and the bushing 17 is threadedly secured within the tubular member 11, it is necessary that both positive interlocking means be provided in order to prevent separation of these components due to the shocks and stresses of driving and steering which are transmitted through the assembly. The present invention contemplates the securing together of these members by means of the deformation of the components into positively locked engagement. This deformation may be suitably carried out by means of a simple staking operation in which one or more portions 35 of the tubular member 11 are deformed radially inwardly to cause a corresponding deformation of a central portion 36 of the thread 14 of the member 11 and the thread 18 of the member 17. The deformation will be transmitted inwardly to deform the interior thread 19 of the bushing 17 on the threaded end portion 34 of the control member 33, as at 37. The deformation or staking of the tubular members thus causes deformation of the thread of each of the members of the assembly, thus preventing the release of any of the components from threaded engagement to obviate the possibility of separation during use of the assembly.

In the embodiment of the invention illustrated in Figure 4, reference numerals identical with those of Figures 1-3, inclusive, referred to identical portions of the assembly. In this embodiment of the invention, the cylindrical housing member 11 is apertured as at 15 and 16, and a stud 22 is urged by a spring 30 and a seating plate 27 into contact with the segmental spherical seat 21 formed in one end face of a seating plate 20. However, in this embodiment of the invention an elongated bushing 40 is employed, the bushing having an externally threaded end 41 threaded into the corresponding threaded end 14 of the housing 11. The bushing 40 and the housing 10 are secured together by staked portion 48, as hereinafter described in connection with portions 35 of Figures 1-3.

The free end of the bushing 40 extending beyond the bore 12 is internally threaded as at 42. The internally threaded end of the bushing 40 is slit longitudinally parallel to the axis of the bushing as at 43 for a purpose to be hereinafter described. A split clamping collar 44 encircles the internally threaded, split portion of the bushing 40, the collar having outturned ears 45 apertured to receive a bolt 46 therethrough and a nut 47 threaded on the bolt serving to urge the ears 49 together to exert peripheral clamping pressure upon the bushing.

The internal threads 42 threadedly receive a threaded free end 34 of a control member 33, hereinbefore described in connection with the embodiment of Figures 1-3, inclusive.

In this embodiment of the invention, it will be seen that adjustment of the control arm axially of the bushing 40 is possible by loosening the nut 47 to permit spreading of the slit portion 43 of the bushing and rotating the control arm 33 to thread the end 34 into and out of the internally threaded portions of the bushing. This adjustment of the control arm 33 is possible even though the externally threaded portion 41 of the bushing 40 is staked within the corresponding end of the tubular housing member 11 by deformation of the housing as at 48 and a corresponding deformation of the mating threads of the bushing 40 and the housing 11, as at 49.

The method of making a control arm end assembly of the present invention is simple and efficient in that it securely locks the bushing within the housing by a simple performance of a staking operation. The method includes the threading of the bushing 17 or 40 into the corresponding end of the housing 11, the positioning of the seating plate 20 into abutting relation to a corresponding end of a bushing, the insertion of the ball seat 23 of stud 22 through the larger aperture 15 and the positioning of the second seating face 27, the spring 30 and the threaded plug 31 in assembled relation within the bore. Following the assembly of the device of the present invention, it is only necessary to perform the requisite staking operation to secure the bushing, and in the case of the embodiment of Figures 1-3, inclusive, the bushing 17 and the control arm end 34 within the housing 11.

It will be understood that modifications and variations may be effected without departing from the scope of the novel concepts of the present invention.

I claim as my invention:

1. An end assembly for an automotive steering linkage comprising a tubular housing having a threaded bore and a radially extending aperture communicating with said bore, a cylindrical bushing threaded into the bore of said housing and also having an internally threaded bore for receiving the end of a control arm of considerably smaller diameter than the housing, a first seating plate extending radially across the bore of said housing and having one end face formed with a segmental spherical seating face, the other end face of said plate being bottomed against an adjacent end of said bushing, a second seating plate extending radially across the bore of the housing in spaced relation to said first seating face and having a segmental spherical seating face formed in one end face thereof, means biasing said second seating face toward said first seating face, an adjustment plug threadedly inserted in the end of said housing outwardly of said second plate and said biasing means for adjusting the bias of said means, and a ball joint having a ball head interposed between said seating faces in said bore and in contact therewith and a stud extending radially outwardly from said housing through said aperture, said bushing and said housing being secured together in interlocked threaded engagement by a plurality of inwardly extending complementary deformations extending radially inwardly from the housing and deforming both the mating threads and adjacent body portions of both the housing and the bushing.

2. An end assembly for an automotive steering linkage comprising a tubular housing having a threaded bore and a radially extending aperture communicating with said bore, a cylindrical bushing threaded into the bore of said housing and also having an internally threaded bore for receiving the end of a control arm of considerably smaller diameter than the housing, said bushing having a slotted outer end portion to clamp the end of the control arm received by the internally threaded bore in said bushing, a first seating plate extending radially across the bore of said housing and having one end face formed with a segmental-spherical seating face, the other end face of said plate being bottomed against an adjacent end of said bushing, a second seating plate extending radially across the bore of the housing in spaced relation to said first seating face and having a segmental-spherical seating face formed in one end face thereof, means biasing said second seating face toward said first seating face, an adjustment plug threadedly inserted in the end of said housing outwardly of said second plate and said biasing means for adjusting the bias of said means, and a ball joint having a ball head interposed between said seating faces in said bore and in contact therewith and a stud extending radially outwardly from said housing through said aperture, said bushing and said housing being secured together in interlocked threaded engagement by a plurality of inwardly extending complementary deformations extending radially inwardly from the housing and deforming both the mating threads and adjacent body portions of both the housing and the bushing.

3. An end assembly for an automotive steering linkage comprising a tubular housing having a threaded bore and a radially extending aperture communicating with said bore, a cylindrical bushing threaded into the bore of said housing and also having an internally threaded bore substantially coextensive with the external threaded portion of the bushing where the same is threaded into the bore of the housing for receiving the end of a control arm of considerably smaller diameter than the housing to provide a substantially coaxial overlapping relation between said housing, said bushing and the control arm which may be threaded into the bushing, a first seating plate extending radially across the bore of said housing and having one end face formed with a segmental-spherical seating face, the other end face of said plate being bottomed against an adjacent end of said bushing, a second seating plate extending radially across the bore of the housing in spaced relation to said first seating face and having a segmental - spherical seating face formed in one end face thereof, means biasing said second seating face toward said first seating face, an adjustment plug threadedly inserted into the end of said housing outwardly of said second plate and said biasing means for adjusting the bias of said means, and a ball joint having a ball head interposed between said seating faces in said bore and in contact therewith and a stud extending radially outwardly from said housing through said aperture, said bushing and said housing being secured together in interlocked threaded engagement by a plurality of inwardly extending complementary deformations extending radially inwardly from the housing and deforming both the mating threads and the adjacent body portions of both the housing and the bushing and further deforming both the mating threads and the body portion of both the bushing and the received end of the control arm when the control arm is threaded into the bushing.

References Cited in the file of this patent

UNITED STATES PATENTS

| Number | Name | Date |
|---|---|---|
| 604,863 | Hoyer | May 31, 1898 |
| 1,199,048 | Breeze | Sept. 26, 1916 |
| 1,428,024 | Garman | Sept. 5, 1922 |
| 1,537,330 | Buckendale | May 12, 1925 |
| 1,550,672 | Breeze | Aug. 25, 1925 |
| 1,559,402 | Boardman | Oct. 27, 1925 |
| 1,797,691 | Merrill | Mar. 24, 1931 |
| 1,854,925 | Crawford | Apr. 19, 1932 |
| 2,067,553 | Todd | Jan. 12, 1937 |
| 2,175,429 | Chayne | Oct. 10, 1939 |
| 2,188,178 | Eby | June 23, 1940 |
| 2,444,666 | Orain | July 6, 1948 |
| 2,553,789 | Ricks | May 22, 1951 |

FOREIGN PATENTS

| Number | Country | Date |
|---|---|---|
| 845,561 | France | May 12, 1925 |